J. E. LEAMANN.
BREAD PANS.
APPLICATION FILED NOV. 17, 1908.
917,622. Patented Apr. 6, 1909.
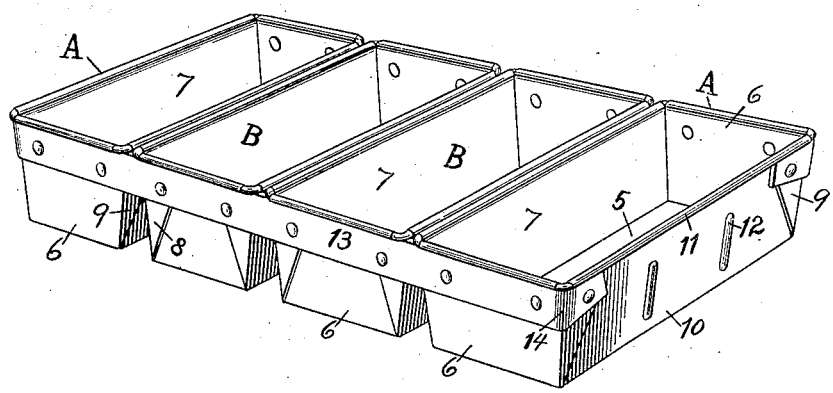
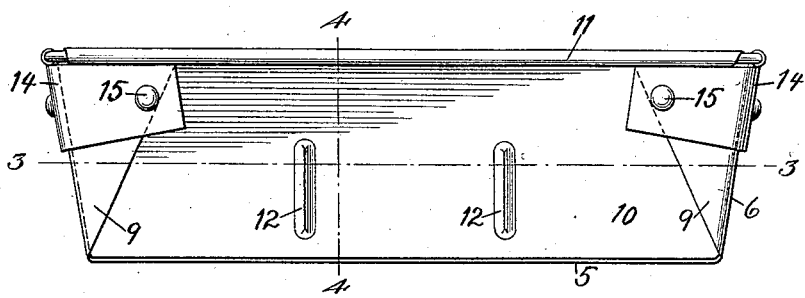
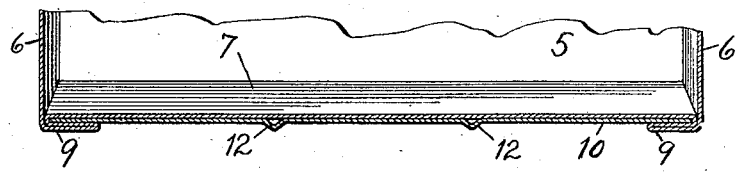
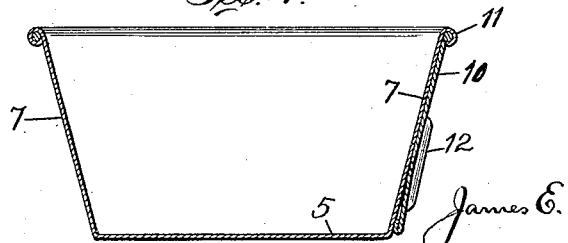
Witnesses
Edwin L. Bradford
G. Ferdinand Vogt
Inventor
James E. Leamann
By
Mann & Co.
Attorneys
THE NORRIS PETERS CO., WASHINGTON, D. C.

UNITED STATES PATENT OFFICE.

JAMES E. LEAMANN, OF BALTIMORE, MARYLAND, ASSIGNOR TO THE AUGUST MAAG COMPANY OF BALTIMORE CITY, OF BALTIMORE, MARYLAND, A CORPORATION OF MARYLAND.

BREAD-PANS.

No. 917,622.  Specification of Letters Patent.  Patented April 6, 1909.

Application filed November 17, 1908. Serial No. 463,113.

*To all whom it may concern:*

Be it known that I, JAMES E. LEAMANN, a citizen of the United States, residing at Baltimore, in the State of Maryland, have invented certain new and useful Improvements in Bread-Pans, of which the following is a specification.

This invention relates to an improvement in bread pans for use in bakers' ovens.

One object of the invention is to provide an improved construction whereby a number of single-loaf bread-pans may be connected together in series and each two end-pans of the series have protected outermost walls.

The invention is shown in the accompanying drawing in which—

Figure 1 is a view of a series of individual bread-pans connected together and having my improvements. Fig. 2 is a side view of the end-pan of the series. Fig. 3 is a longitudinal section of the reinforced side of a pan taken on the line 3—3 of Fig. 2. Fig. 4 is a cross-section of the improved bread-pan.

The drawing shows rectangular bread-pans each for one loaf of bread; these pans are commonly made of a sheet of metal shaped to form a bottom, 5, two end walls, 6, and two side walls, 7. The corners of the pans are formed by V-shaped folds, 8, which ordinarily have position on the ends, 6, of the pan. The bottom and all four walls of the ordinary pan only have one thickness of sheet-metal.

In Fig. 1 which shows four pans connected together, the two pans, B, B, which are intermediate of the end pans, A, are made in the ordinary manner just described. The two end pans, however, of the four pans shown in Fig. 1 have one side wall, 7, single thick and the opposite side wall double thick.

Referring now to the pan shown in Figs. 2, 3, and, 4, it will be seen that one side wall consists of a single thickness, 7, and the opposite side wall consists of two thicknesses, 7, 10. The two thicknesses are produced by adding an outer thickness, 10, to the inner thickness, 7, and securing said outer thickness to its position; the outer thickness comprises the reinforcement herein-before mentioned. In this reinforced pan, A, the V-shaped fold, 9, at each corner is folded over and laps upon the end of the side-reinforcing plate, 10; these folds produce four thicknesses of metal at the side adjacent the corner as seen in Fig. 3. As the pans have inclined or flaring walls, and as the two end edges of the said outer plate, 10, are inclined to correspond with the flare of the end of the pan, it will be seen that said V-shaped folds, 9, serve to hold the plate, 10, in its proper position especially as the top edges of all the walls are coiled over outward,—the coil, 11, of the side wall being in contact with the upper edge of the said plate, 10. For further security in holding the reinforcing plate, 10, a rivet, 15, may be employed; this rivet passing through all four thicknesses.

In order to still further increase the stiffness of the outermost side wall of the end-pans, the outer thickness, 10, of said wall is provided with several vertically-extending outward swages or protrusions, 12. These are formed, before the plate is attached to the pan, by means of a die pressing the metal outward. The several pans are secured together by bars, 13, extending along each end of all the pans of the series, and the ends of said bars bent at a right-angle, 14, and said bent ends projecting around the corner and overlapping on the double-thick side, and the rivet, 15, passed through said bent end, 14, and also through the four thicknesses of sheet-metal where the fold, 9, is located. This combination and arrangement give the desired strength to the series of pans and reinforces the side of each end-pan.

Having thus described my invention what I claim and desire to secure by Letters Patent is,—

1. The combination of a series of rectangular bread-pans, the two end-pans of the series each having its outermost side-wall composed of two thicknesses—the inner thickness having an interior surface which is continuously straight from end to end and the outer thickness provided with exteriorly-protruding and vertically-extending swage marks, and the innermost side-wall of the end-pan composed of one thickness only of sheet-metal, and the one or more pans of the series which are intermediate of said two end-pans having walls of one thickness only, and means extending along all the pans of the series and securing them together.

2. The combination of a series of sheet-metal bread-pans in contact with each other, and two end-pans, A, of the series each having one side-wall of one thickness only and the opposite side-wall of two thicknesses secured together said two thicknesses constituting the end or outer side of the series, and the pans, B, of the series which are intermediate of said end-pans having all their walls of one thickness only, and metal bars extending along each end of all the pans of the series and the ends of said bars bent and projecting around and overlapping onto the said two thicknesses of said end-pans and secured thereto.

In testimony whereof I affix my signature in presence of two witnesses.

JAMES E. LEAMANN.

Witnesses:
 CHAS. B. MANN,
 G. FERDINAND VOGT.